(12) United States Patent
Fechner et al.

(10) Patent No.: US 8,283,270 B2
(45) Date of Patent: Oct. 9, 2012

(54) BORON-POOR NEUTRAL GLASS WITH TITANIUM AND ZIRCONIUM OXIDES

(75) Inventors: Joerg Hinrich Fechner, Mainz (DE); Christof Kass, Tirschenreuth (DE)

(73) Assignee: Schott AG, Mainz (DE)

( * ) Notice: Subject to any disclaimer, the term of this patent is extended or adjusted under 35 U.S.C. 154(b) by 313 days.

(21) Appl. No.: 12/813,572

(22) Filed: Jun. 11, 2010

(65) Prior Publication Data

US 2010/0317506 A1 Dec. 16, 2010

(30) Foreign Application Priority Data

Jun. 12, 2009 (DE) .................. 10 2009 026 923

(51) Int. Cl.
*C03C 3/083* (2006.01)
*C03C 3/093* (2006.01)

(52) U.S. Cl. ............ 501/68; 501/67; 501/66; 65/134.1; 65/134.3; 65/134.9; 215/400

(58) Field of Classification Search .................... 501/66, 501/67, 68; 215/400; 65/134.1–134.9
See application file for complete search history.

(56) References Cited

U.S. PATENT DOCUMENTS

| | | | |
|---|---|---|---|
| 4,065,317 A | 12/1977 | Baak et al. | |
| 4,562,161 A * | 12/1985 | Mennemann et al. | 501/59 |
| 4,567,104 A | 1/1986 | Wu | |
| 5,459,110 A | 10/1995 | Brix | |
| 5,599,753 A | 2/1997 | Watzke et al. | |
| 6,627,569 B1 | 9/2003 | Naumann et al. | |
| 6,630,420 B1 | 10/2003 | Naumann et al. | |
| 7,144,835 B2 | 12/2006 | Kass et al. | |
| 7,375,043 B2 * | 5/2008 | Fechner et al. | 501/65 |

FOREIGN PATENT DOCUMENTS

| | | |
|---|---|---|
| DE | 44 30 710 | 5/1996 |
| DE | 100 25 465 | 8/2002 |
| GB | 1 191 162 | 5/1970 |
| WO | 00/48955 | 8/2000 |

OTHER PUBLICATIONS

"Testing the Resistance of Glass to Attack by . . . " DIN 12116 Mar. 2001.
"Glass—Hydrolytic Resistance of Glass . . . " International Standard ISO 719 Oct. 1985.
"Glass-Resistance to Attack a Boiling . . . " International Standard ISO 695, May 1991.

* cited by examiner

*Primary Examiner* — Karl Group
*Assistant Examiner* — Elizabeth A Bolden
(74) *Attorney, Agent, or Firm* — Michael J. Striker

(57) ABSTRACT

The neutral glass according to the present invention is characterized by excellent hydrolytic stability, a relatively low processing temperature and low content of boron oxide. Here, the neutral glass has the following composition, in percent by weight based on oxide content: $SiO_2$, 70-79; $B_2O_3$, 0-<5; $Al_2O_3$, <5; $ZrO_2$, 0.5-<5; $TiO_2$, 0.5-6; $Na_2O$, 1-6; $K_2O$, 3 to 8; and $Li_2O$, 0-0.5, wherein a total amount of $SiO_2$ and $B_2O_3$ is less than 83 percent by weight.

16 Claims, No Drawings

BORON-POOR NEUTRAL GLASS WITH TITANIUM AND ZIRCONIUM OXIDES

CROSS-REFERENCE

The invention described and claimed herein below is also described in German Patent Application 10 2009 026 923.1, filed Jun. 12, 2009 in Germany. The aforesaid German Patent Application, whose subject matter is incorporated herein by reference thereto, provides the basis for a claim of priority of invention for the invention claimed herein below under 35 U.S.C. 119 (a)-(d).

BACKGROUND OF THE INVENTION

1. The Field of the Invention

The present invention relates to neutral glass having high hydrolytic stability and a low proportion of boron oxide, its production and use.

2. The Description of the Related Art

Boron oxide is known to be teratogenic. This fact has relevance, in particular in the process of producing glasses, because with the use of boron oxide laborious occupational-safety measures are necessary which increase the production costs of the product. Further, boron components which are leached out of the glass may have toxicologically critical effects on living beings.

Due to its otherwise extremely advantageous properties, in particular with respect to chemical and physical resistance, borosilicate glass is often used in primary pharmaceutical packaging, for example in ampoules and syringes.

It is desirable to have glasses which on the one hand have the excellent properties, in particular with respect to hydrolytic stability, of borosilicate glasses and on the other hand have a low content of boron oxide.

In this case it is further desirable that the processing temperature is low so that the production costs are low.

In prior art (e.g. U.S. Pat. No. 7,144,835 B2) the processing temperature of glasses having high stability is reduced by the addition of a relatively large amount of boron oxide which replaces one part of $SiO_2$ in the glass. Thus glasses can be produced which have excellent stability with a good processing temperature. However this concept cannot be used any longer due to the discovery of the harmfulness of boron oxide. If instead of boron oxide more $SiO_2$ is used, the low melting temperatures cannot be achieved any longer.

A similar strategy is also used in DE 44 30 710 C1. In this case the inventors tried to lower the content of boron oxide and increase the proportions of other components, such as $Al_2O_3$ and $SiO_2$. The result is a glass having a middle-rate processing temperature which only has good hydrolytic stability if it contains more than 8% by weight of boron oxide.

SUMMARY OF THE INVENTION

Therefore it is an object of the present invention to provide a neutral glass having high hydrolytic stability, low processing temperature and a very low content of boron oxide.

This object is attained by the subject matter of the appended patent claims.

In particular, the object is attained by a neutral glass having a composition, in percent by weight based on oxide content, comprising:

| | |
|---|---|
| $SiO_2$ | 70 to 79 |
| $B_2O_3$ | 0 to <5 |
| $Al_2O_3$ | 1 to <5 |
| $ZrO_2$ | 0.5 to <5 |
| $TiO_2$ | 0.5 to 6 |
| $Na_2O$ | 1 to 6 |
| $K_2O$ | 3 to 8 |
| $Li_2O$ | 0 to 0.5, | wherein a total amount of $SiO_2$ and $B_2O_3$ is less than 83 percent by weight.

Preferably the total amount of $SiO_2$ and $B_2O_3$ is less than 82 percent by weight, more preferably it is less than 81 percent by weight, and further preferably can be even less than 80 percent by weight. The total amount of aluminum oxide and zirconium oxide may be less than 10 percent by weight, preferably less than 8 percent by weight, and more preferably even less than 6.5 percent by weight.

Preferably the glass according to the present invention consists of at least 90% by weight and further preferably at least 95% by weight of the above-mentioned components. According to more preferred embodiments, the glass is free of other components, which means that they are not mixed into the starting mixture. Impurities may be present in the glass.

The neutral glass according to the present invention can be classified into the hydrolytic class I. Its processing temperature (VA) is lower than 1260° C. The processing temperature is the temperature at which the glass has a viscosity which is suitable for processing. Such a viscosity is a viscosity of about $10^4$ dPas. Preferably the processing temperature of the glass is lower than 1220° C.

Unless otherwise stated, all amounts of ingredients in the final glass compositions are given in % by weight based on oxide content.

For achieving the property of good hydrolytic stability and low viscosity according to the present invention the neutral glasses according to the present invention comprise $TiO_2$ as well as $ZrO_2$.

Titanium dioxide lowers the viscosity (processing temperature) of the neutral glass. In addition, it provides protection against UV radiation and prevents solarization (darkening by exposure of light). It has also been shown that these advantageous properties are present in the case of amounts of $TiO_2$ of or greater than 0.5% by weight. But the content of titanium dioxide should not exceed 6% by weight, because otherwise the devitrification properties of the resulting glass would deteriorate. If its content is less than the above-mentioned value of at least 0.5% by weight, then the viscosity of the glass is too high. Preferably, the minimum content of $TiO_2$ should even be 1% by weight.

$ZrO_2$ in combination with $TiO_2$ supports the hydrolytic stability of the glasses according to the present invention. Therefore, the neutral glass contains an amount of at least 0.5% by weight of $ZrO_2$.

Preferred embodiments may even comprise at least 1% by weight. With lower amounts this effect cannot be observed. A maximum proportion of less than 5% by weight should not be exceeded. The reason for that is that in the case of larger amounts of $ZrO_2$ in the glass the viscosity of the glass would be increased.

Thus, a preferred embodiment of the neutral glass of the present invention has a composition, in percent by weight based on oxide content, comprising:

| | |
|---|---|
| $ZrO_2$ | 1 to <5 |
| $TiO_2$ | 1 to 6. |

Zirconium oxide can also be present in amounts of 2 to less than 5 percent by weight, also in amounts of 3 to 4.5 percent by weight.

Suitable amounts for titanium oxide in the composition are also 1.5% by weight to 5% by weight, also 1.5 to 4.0% by weight.

It has been shown that it is particularly advantageous to adjust a weight ratio of $ZrO_2$ to $TiO_2$ in a weight range of between 1.5:1 and 0.6:1. Advantageous hydrolytic stability can be achieved when the weight ratio of $ZrO_2$ to $TiO_2$ is within this range. But the sum of the amounts of $ZrO_2$ and $TiO_2$ should not exceed 10% by weight, because otherwise the hydrolytic stability is again compromised. In particularly preferred embodiments the total amount of $ZrO_2$ and $TiO_2$ is greater than 2.5% by weight. In absolutely particularly preferred embodiments an extraordinarily good stability of the neutral glass is achieved when the respective amounts of $ZrO_2$ and $TiO_2$ are each at least 2.5% by weight.

The neutral glass according to the present invention has a low content of boron oxide according to the present invention. Boron oxide is harmful to health so that the use of it has to be limited as much as possible, in particular for glasses for primary pharmaceutical packaging. Due to this reason the maximum proportion of $B_2O_3$ in the neutral glass according to the present invention is limited to less than 5% by weight and preferably to 4.5% by weight or less. Particularly preferred embodiments do even not contain any boron oxide.

Also PbO is harmful to health so that the glass according to the present invention preferably does not contain this oxide. Preferably, the same applies to other heavy metals. Heavy metals in the sense of this invention comprise lead, chromium, iron, cobalt, copper, manganese, molybdenum, nickel and vanadium; preferably also zinc and tin.

The neutral glass according to the present invention comprises $SiO_2$ in amounts of at least 70 and at most 79% by weight. Suitable amounts of this oxide are, for example, 72, 75, or 77% by weight. Thus the resulting glass will have sufficient stability and at the same time a low melting temperature. With higher amounts of $SiO_2$ the processing temperature of the glass would be increased, whereas smaller amounts would compromise the hydrolytic stability of the glass. In certain embodiments $SiO_2$ is supported as glass former by a small amount of $B_2O_3$. As mentioned above, boron oxide can replace a part of the amount of silicon dioxide to provide the stability together with an acceptable melting point. It has been shown that the sum of both components $SiO_2$ and $B_2O_3$ should be less than 83% by weight for achieving the properties according to the present invention. Suitable values for the sum of these two components can also be 81, 80 or 79.5% by weight. In particular in the case of higher values for the sum of these components it is not possible to adjust to a processing temperature, which is preferably less than 1260° C. without using a content of boron oxide which is too high. In preferred embodiments the total amount of $SiO_2$ and $B_2O_3$ is even less than 78.1% by weight.

As glass formers $SiO_2$ and optionally $B_2O_3$ are further assisted by $Al_2O_3$. The content of aluminum oxide in the glass according to the present invention is at least one % by weight. Preferred embodiments comprise at least 2.5% by weight of $Al_2O_3$. It permits the glass of the present invention to contain greater amounts of alkali metal oxides because of its property to stronger integrate the alkalis. But a content of $Al_2O_3$ of 5% by weight or higher is too great, because then the viscosity of the resulting glass is too high.

Preferably the neutral glass according to the present invention has a hydrolytic stability according to ISO 719 of at most 15 μg per g. Even more preferably the hydrolytic stability is at most 14 μg per g, and even at most 13 μg per g.

The neutral glass according to the present invention has a processing temperature of at most 1260° C. and preferably at most 1220° C.

A particularly preferred embodiment of the neutral glass that has high hydrolytic stability has a composition, in % by weight based on oxide content, comprising:

| | |
|---|---|
| $SiO_2$ | 70 to 79 |
| $B_2O_3$ | 0 to <5 |
| $Al_2O_3$ | 1 to <5 |
| $ZrO_2$ | 0.5 to <5 |
| $TiO_2$ | 0.5 to 6 |
| $Na_2O$ | 1 to 6 |
| $K_2O$ | 3 to 8 |
| $Li_2O$ | 0 to 0.5, | wherein the total amount of the alkali metal oxides in the composition is between >9% by weight and 14% by weight, the total amount of $SiO_2$ and $B_2O_3$ is less than 83% by weight and the total amount $ZrO_2$ and $TiO_2$ is between 1% by weight and 10% by weight.

The neutral glass according to the present invention comprises potassium oxide and zirconium oxide in combination. This combination results in good hydrolytic stability. In addition, zirconium oxide improves the alkali resistance of the glass. In addition, potassium oxide improves the devitrification properties. The individual amounts of $ZrO_2$ and $K_2O$ are at least 0.5% by weight and 3% by weight, respectively. The maximum individual amounts of $ZrO_2$ and $K_2O$ are <5% by weight and <8% by weight, respectively. If these maximum values are exceeded, the chemical resistance of the glass deteriorates and the viscosity of the glass increases, respectively. Due to the synergistic effect of the combination partners $ZrO_2$ and $K_2O$ these two components in sum have a preferred content of at least 8% by weight and particularly preferably at least 9% by weight in the composition according to the present invention. In this case it is particularly preferred that the content of $K_2O$ exceeds the content of $ZrO_2$. It is particularly preferred that the content of $K_2O$ is 1.5 times to 2.5 times higher than the content of $ZrO_2$.

The neutral glass according to the present invention further comprises $Al_2O_3$ and $Na_2O$ in combination, because in this case also the hydrolytic stability of the glass is increased. In addition, $Al_2O_3$ improves the devitrification properties. The contents of $Al_2O_3$ and $Na_2O$ in the composition according to the present invention are at least 1% by weight each. The upper limit of the content of $Al_2O_3$ is <5% by weight and the upper limit of the content of $Na_2O$ is 6% by weight. When these upper limits are exceeded, then the viscosity of the glass is increased and the chemical resistance deteriorates, respectively.

Potassium oxide, sodium oxide and lithium oxide improve the meltability of the glass and reduce the viscosity. These components are contained in the glass according to the present invention in individual amounts of at most 8% by weight, 6% by weight and 0.5% by weight, respectively. If these upper limits are exceeded, then the chemical resistance deteriorates. Therefore, the sum of the alkali oxides in the neutral glass according to the present invention is preferably between >9% by weight and 14% by weight.

A particularly preferred embodiment of the neutral glass according to the invention has a composition, in % by weight based on oxide content, comprising:

| | |
|---|---|
| $SiO_2$ | 70 to 79 |
| $B_2O_3$ | 0 to <5 |
| $Al_2O_3$ | 1 to <5 |
| $ZrO_2$ | 1 to <5 |
| $TiO_2$ | 1 to 6 |
| $Na_2O$ | 1 to 6 |
| $K_2O$ | 3 to 8 |
| $Li_2O$ | 0 to 0.5, | wherein the sum total amount of the alkali metal oxides in the glass is between >9% by weight and 14% by weight, the sum total amount of $SiO_2$ and $B_2O_3$ is less than 83% by weight and the sum total amount of $ZrO_2$ and $TiO_2$ is greater than 2.5% by weight.

A more preferred embodiment of the neutral glass according to the invention has a composition, in % by weight based on oxide content, comprising:

| | |
|---|---|
| $SiO_2$ | 70 to 79 |
| $B_2O_3$ | 0 to 4.5 |
| $Al_2O_3$ | 1 to <5 |
| $ZrO_2$ | 1 to <5 |
| $TiO_2$ | 1 to 6 |
| $Na_2O$ | 1 to 6 |
| $K_2O$ | 3 to 8 |
| $Li_2O$ | 0 to 0.5, | wherein the sum total amount of the alkali metal oxides in the glass is between >9% by weight and 14% by weight, the sum total amount of $SiO_2$ and $B_2O_3$ is lower than 83% by weight and the sum total amount of $ZrO_2$ and $TiO_2$ is greater than 2.5% by weight.

In particularly preferred embodiments the neutral glass according to the present invention does not contain $B_2O_3$.

According to the present invention a method for the production of the above-described neutral glass is provided, which comprises the steps of:
 a) mixing the glass components,
 b) melting the glass components to form a glass melt, and
 c) optionally refining the glass melt.

According to the present invention the neutral glass of the invention can be used as a glass for primary pharmaceutical packaging material and as a glass for food packaging.

The neutral glasses have a particularly advantageous hydrolytic stability. The hydrolytic stability determines the classification of glasses into so-called hydrolytic classes.

The hydrolytic class or also hydrolytic resistance (or stability) of a glass is a measure of the extractability of alkaline compounds from the glass by the attack of water at 98° C. The hydrolytic class also provides a basis for the classification of kinds of glasses for the pharmaceutical use according to the European pharmacopoeia. The standard test ISO 719 (DIN 12111) is used to determine the hydrolytic class of a glass. Classification of glasses into five different classes is conducted according to the following procedure:
 2 g of glass having a particle size of 300 to 500 μm are treated in 50 ml of bidistilled water at 98° C. for 60 min. 25 ml of the obtained solution are titrated with 0.01 mol/l HCl until neutral conditions are reached. The volume of the used HCl is noted and the glass is classified according to the information given in the following table I:

TABLE I

Classification Criteria for Different Hydrolytic Classes of Glass

| Amount of 0.01 M HCl used to neutralize the extracted alkaline oxides in ml | Extracted equivalent of $Na_2O$, μg | Hydrolytic class |
|---|---|---|
| up to 0.1 | up to 31 | 1 |
| more than 0.1, up to 0.2 | more than 31, up to 62 | 2 |
| more than 0.2, up to 0.85 | more than 62, up to 264 | 3 |
| more than 0.85, up to 2.0 | more than 264, up to 620 | 4 |
| more than 2.0, up to 3.5 | more than 620, up to 1085 | 5 |
| more than 3.5 | more than 1085 | >5 |

Accordingly, the standard test ISO 719 is not suitable for glasses, which only contain low or no extractable alkaline constituents, but are nevertheless attacked by water, e.g. quartz glass, $B_2O_3$ glass or $P_2O_5$ glass.

Common glasses are classified into the following classes:
Hydrolytic Class 1 (Type I)
 Borosilicate glasses (e.g. DURAN® Glass, PYREX®, FIOLAX®, i. a.) belong to this class, also referred to as neutral glass. Glass of this class normally contains substantial amounts of boron and aluminum oxides. Neutral glass has high resistance to temperature shock and also highest hydrolytic resistance due to its composition. Against acidic and neutral solutions it has very good chemical resistance, due to its low alkali content also against alkaline solutions.
Hydrolytic Class 2 (Type II)
 Normally, this class contains borosilicate glasses having lower hydrolytic resistance and a lower content of boron oxide in comparison to glass of type I.
Hydrolytic Class 3 (Type III)
 Glass of hydrolytic class 3 normally consists of soda-lime silicate glass and has a mean hydrolytic resistance which is less than the glass of class 1 at least by a factor of 10.

The hydrolytic class according to ISO 719 (DIN 12111) can be divided into the acid class according to DIN 12116 and the base class according to DIN 52322 (ISO 695).

In the following, a detailed description of the test according to ISO 719 is shown which was conducted with the glass according to the present invention:

50 g of glass are crushed with the help of a hammer. The broken bits are further comminuted in a ball mill. The resulting glass particles are screened with sieves having a mesh size of 300 and 500 μm. 3×3 g of glass particles are transferred into 3 beakers from the fraction of particles having a size of 300 μm. In these beakers the glass particles are purified by several washing steps with acetone, wherein adherent glass powder is removed. The purified glass particles are dried in a compartment drier for 20 minutes at 140° C. From this particles 3×2 g are transferred into 50 ml volumetric flasks and they are filled with bidistilled water.

These flasks are treated on a water bath for 1 hour at 98° C. During this treatment alkalis from the glass are dissolved. Subsequently, the solution is mixed with an indicator (methyl red) and is titrated with hydrochloric acid until the point of change is reached. A consumption of 1 ml of 0.01 molar hydrochloric acid corresponds to an alkali release of the glass of 310 μg of $Na_2O$ per g of glass. A glass having a hydrolytic stability of type I is allowed to have a maximum release of 31

µg of $Na_2O$ per g of glass. Then the hydrolytic stability corresponds to class HGB 1 according to ISO 719.

The glasses according to the present invention have alkali releases of between ⅓ and ½ of the limiting value for a glass of type I. The results measured according to the standard DIN 12111, which is no longer valid (mentioned in patent DE 4430710 C1), are comparable with those according to ISO 719.

The following examples are provided for the explanation of the present invention and not for the limitation of its subject matter.

It should be noted that the amounts of the ingredients indicated in the following table II are amounts of respective components that are present in the final glass. Initially used amounts of, in particular, boron oxide are usually from 5% by weight to 15% by weight higher, based on the amount of boron oxide present in the final glass. For example, the final glass will likely contain about 3.05% by weight of boron oxide, when the glass batch composition contains 3.35% by weight of boron oxide. This is at least true for example 1 of the present invention, and the respective production of the glass.

It is well within the knowledge of the skilled person that different melting conditions result in different evaporations of respective compounds, such as boron oxide. The latter of course leads to different amounts of the respective compound, like boron oxide, in the glass.

The skilled person also is aware that evaporation of compounds, for example boron oxide, during the production process of the glass results in respective increased amounts of remaining compounds in the glass. This is in particular true for the normal compound(s), in the following examples, such as silica.

TABLE II

EXAMPLES OF THE BORON-POOR GLASSES OF THE PRESENT INVENTION

| Component | Example 1 | Example 2 | Example 3 | Example 4 |
|---|---|---|---|---|
| $SiO_2$ | 76.30 | 75.90 | 74.90 | 73.30 |
| $TiO_2$ | 2.70 | 2.70 | 3.00 | 5.00 |
| $Al_2O_3$ | 3.70 | 3.00 | 3.00 | 3.00 |
| $B_2O_3$ | 3.05 | 4.70 | 4.70 | 4.80 |
| $K_2O$ | 6.60 | 6.60 | 7.00 | 6.60 |
| $Na_2O$ | 3.78 | 4.00 | 4.00 | 4.00 |

TABLE II-continued

EXAMPLES OF THE BORON-POOR GLASSES OF THE PRESENT INVENTION

| Component | Example 1 | Example 2 | Example 3 | Example 4 |
|---|---|---|---|---|
| $Li_2O$ | 0.30 | 0.30 | 0.30 | 0.30 |
| $ZrO_2$ | 3.60 | 3.00 | 3.00 | 3.00 |
| ISO 719 | 11 µg/g | 12 µg/g | 14 µg/g | 13 µg/g |
| VA | 1254° C. | 1246° C. | 1220° C. | 1202° C. |

TABLE III

| | Comparative Examples | | | | | | |
|---|---|---|---|---|---|---|---|
| Component | V1 | V2 | V3 | V4 | V5 | V6 | V7 |
| $SiO_2$ | 74.00 | 71.00 | 66.92 | 71.00 | 75.30 | 80.00 | 80.50 |
| $TiO_2$ | — | — | 0.4 | 0.1 | — | — | — |
| $Al_2O_3$ | 4.75 | 6.5 | 4.5 | 5.75 | 5.4 | 4.7 | 4.8 |
| $B_2O_3$ | 4.9 | 5.6 | 6 | 6.2 | 10.5 | 5.3 | 5.3 |
| $K_2O$ | 2.1 | 2.57 | 2.8 | 0.35 | — | 4.0 | — |
| $Na_2O$ | 8.75 | 8.93 | 6.9 | 11.4 | 7.4 | 2.6 | 6.8 |
| $Li_2O$ | — | — | 0.1 | — | — | 1.3 | 0.5 |
| BaO | 2.2 | 2.1 | 1.6 | 2 | — | 0.2 | 0.2 |
| CaO | 3.3 | 3.3 | 4.2 | 3.2 | 1.4 | 0.3 | 0.3 |
| $ZrO_2$ | — | — | — | — | — | 1.6 | 1.6 |
| $Fe_2O_3$ | — | — | 1.8 | — | — | — | — |
| $MnO_2$ | — | — | 4.78 | — | — | — | — |
| ISO 719 | 22 µg/g | 23 µg/g | 22 µg/g | 32 µg/g | 12 µg/g | — | — |
| VA | 1110° C. | — | 1066° C. | 1032° C. | 1165° C. | 1294° C. | 1322° C. |

While the invention has been illustrated and described as embodied in boron-poor neutral glass with titanium and zirconium oxides, it is not intended to be limited to the details shown, since various modifications and changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed is new and is set forth in the following appended claims.

We claim:

1. A neutral glass having high hydrolytic stability with a composition comprising, in percent by weight based on oxide content:

| | |
|---|---|
| $SiO_2$ | 70 to 79 |
| $B_2O_3$ | 0 to <5 |
| $Al_2O_3$ | 1 to <5 |
| $ZrO_2$ | 0.5 to <5 |
| $TiO_2$ | 0.5 to 6 |
| $Na_2O$ | 1 to 6 |
| $K_2O$ | 3 to 8 |
| $Li_2O$ | 0 to 0.5, | wherein a total amount of $SiO_2$ and $B_2O_3$ in the composition is less than 83 percent by weight.

2. The neutral glass according to claim 1, wherein the composition comprises, in percent by weight base on oxide content:

| | |
|---|---|
| $ZrO_2$ | 1 to <5 |
| $TiO_2$ | 1 to 6. |

3. The neutral glass according to claim 1, wherein the composition comprises in percent by weight based on oxide content:

| | |
|---|---|
| $B_2O_3$ | 0 to 4.5. |

4. The neutral glass according to claim 1, wherein the composition comprises a sum total amount of alkali metal oxides between >9 percent by weight and 14 percent by weight.

5. The neutral glass according to claim 1, wherein the composition comprises a sum total amount of $ZrO_2$ and $TiO_2$ of at most 10% by weight.

6. The neutral glass according to claim 1, wherein the composition comprises a sum total amount of $ZrO_2$ and $TiO_2$ that is greater than 2.5 percent by weight.

7. The neutral glass according to claim 1, wherein a weight ratio of $ZrO_2$ to $TiO_2$ is in a weight range between 1.5:1 and 0.6:1.

8. The neutral glass according to claim 1, wherein the composition does not contain $B_2O_3$.

9. The neutral glass according to claim 1, wherein the composition comprises $ZrO_2$ in an amount of at least 2.5 percent by weight.

10. The neutral glass according to claim 1, wherein the composition comprises $TiO_2$ in an amount of at least 2.5 percent by weight.

11. The neutral glass according to claim 1, having a hydrolytic stability according to ISO 719 that is no more than 15 μg per g.

12. The neutral glass according to claim 1, having a processing temperature of at most 1260° C.

13. The neutral glass according to claim 12, wherein the processing temperature is at most 1220° C.

14. A method of producing a neutral glass, said method comprising the steps of:
  a) mixing glass components,
  b) melting the glass components to form a glass melt, and
  c) optionally refining the glass melt;
whereby a neutral glass with the composition according to claim 1 is formed by the method.

15. A primary pharmaceutical packaging material comprising the neutral glass according to claim 1.

16. A food packaging material comprising the neutral glass according to claim 1.

* * * * *